(12) United States Patent
Ghosh et al.

(10) Patent No.: US 11,917,053 B2
(45) Date of Patent: *Feb. 27, 2024

(54) COMBINED SHA2 AND SHA3 BASED XMSS HARDWARE ACCELERATOR

(71) Applicant: Intel Corporation, Santa Clara, CA (US)

(72) Inventors: Santosh Ghosh, Hillsboro, OR (US); Vikram Suresh, Portland, OR (US); Sanu Mathew, Portland, OR (US); Manoj Sastry, Portland, OR (US); Andrew H. Reinders, Portland, OR (US); Raghavan Kumar, Hillsboro, OR (US); Rafael Misoczki, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,629

(22) Filed: Mar. 29, 2022

(65) Prior Publication Data

US 2022/0224514 A1 Jul. 14, 2022

Related U.S. Application Data

(63) Continuation of application No. 16/455,950, filed on Jun. 28, 2019, now Pat. No. 11,303,429.

(51) Int. Cl.
*H04L 9/06* (2006.01)
*G06F 7/503* (2006.01)
(Continued)

(52) U.S. Cl.
CPC .......... *H04L 9/0643* (2013.01); *G06F 7/503* (2013.01); *G06F 9/3012* (2013.01); *H04L 9/3247* (2013.01)

(58) Field of Classification Search
CPC .... H04L 9/0643; H04L 9/3247; G06F 9/3012
(Continued)

(56) References Cited

U.S. PATENT DOCUMENTS

| 7,346,816 B2* | 3/2008 | Liu | ...................... G11C 29/10 |
| | | | 714/718 |
| 2006/0069966 A1* | 3/2006 | Liu | .................. G11C 29/56004 |
| | | | 714/718 |

(Continued)

FOREIGN PATENT DOCUMENTS

| CN | 112152785 A1 | 12/2020 |
| EP | 3758282 A1 | 12/2020 |

OTHER PUBLICATIONS

Extended European Search Report for EP Application No. 21062001.0 dated Aug. 21, 2020, 11 pages.

(Continued)

*Primary Examiner* — Teshome Hailu
(74) *Attorney, Agent, or Firm* — Jaffrey Watson Mendonsa & Hamilton LLP

(57) ABSTRACT

In one example an apparatus comprises a computer readable memory, an XMSS operations logic to manage XMSS functions, a chain function controller to manage chain function algorithms, a secure hash algorithm-2 (SHA2) accelerator, a secure hash algorithm-3 (SHA3) accelerator, and a register bank shared between the SHA2 accelerator and the SHA3 accelerator. Other examples may be described.

20 Claims, 15 Drawing Sheets

(51) Int. Cl.
  *G06F 9/30*    (2018.01)
  *H04L 9/32*    (2006.01)
(58) Field of Classification Search
  USPC ........................................... 380/28
  See application file for complete search history.

(56) References Cited

U.S. PATENT DOCUMENTS

| | | | |
|---|---|---|---|
| 2017/0134163 A1 | 5/2017 | Suresh | |
| 2018/0089467 A1* | 3/2018 | Pedersen | ................ H04L 9/06 |
| 2018/0091309 A1* | 3/2018 | Misoczki | .............. H04L 9/3252 |
| 2018/0097616 A1* | 4/2018 | Gomes | ................ H04L 9/0643 |
| 2018/0183577 A1* | 6/2018 | Suresh | ................ H04L 9/0643 |
| 2019/0095117 A1* | 3/2019 | Park | ....................... G06F 3/061 |

OTHER PUBLICATIONS

Wen Wang, et al., "XMSS and Embedded Systems—XMSS Hardware Accelerators for RISC-V", IACR, International Association for Cryptologic Research, vol. 20181230:125359, Dec. 21, 2018, pp. 1-23, XP061027415.
Santosh Ghosh et al: "Lightweight Post-Quantum-Secure Digital Signature Approach for IoT Motes", IACR, International Association for Cryptologic Research, vol. 20190213:033538, Feb. 7, 2019, pp. 1-23, XP061031800.
Communication under Rule 71(3) EPC (Intention to Grant) for EP Application No. 21062001.0 dated Nov. 10, 23, 1-7 pages.
Perin, "Tuning the Winternitz hash-based digital signature scheme", 2018 IEEE Symposium on Computers and Communications, 6 pages.

* cited by examiner

One-Time Hash-Based Signatures

A private key must only sign a single message

Multi-Time Hash-Based Signatures

A private key can sign a multiple messages

WOTS One-Time Signature Scheme

Message is hashed and parsed into M:67 integers between [0,1,2,...15]

— 205  Public Key pk: 67 components of 32-bytes each

— 210  Signature s: 67 components of 32-bytes each

— 215  Public Key pk: 67 components of 32-bytes each

COMBINED SHA2 AND SHA3 BASED XMSS HARDWARE ACCELERATOR

CLAIM TO PRIORITY

This Application is a continuation of and claims the benefit of and priority to U.S. application Ser. No. 16/455,950 entitled COMBINED SHA2 AND SHA3 BASED XMSS HARDWARE ACCELERATOR, by Santosh Ghosh, et al., filed Jun. 28, 2019, now pending, the entire contents of which are incorporated herein by reference.

BACKGROUND

Subject matter described herein relates generally to the field of computer security and more particularly to accelerators for post-quantum cryptography secure Extended Merkle Signature Scheme (XMSS) and Leighton/Micali Signature (LMS) hash-based signing and verification.

Existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. As a result, there are efforts underway in the cryptography research community and in various standards bodies to define new standards for algorithms that are secure against quantum computers.

Accordingly, techniques to accelerate signature and verification schemes such as XMSS and LMS may find utility, e.g., in computer-based communication systems and methods.

BRIEF DESCRIPTION OF THE DRAWINGS

The detailed description is described with reference to the accompanying figures.

DETAILED DESCRIPTION

Figure 1A:
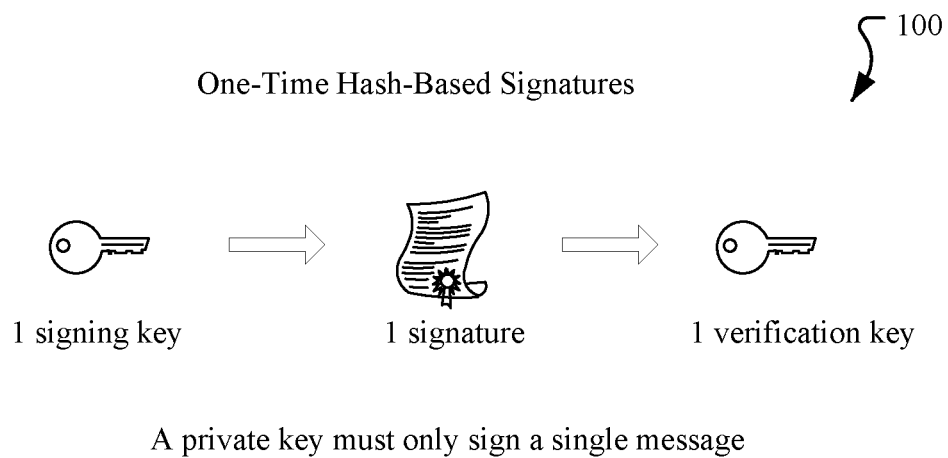
FIGS. 1A and 1B are schematic illustrations of a one-time hash-based signatures scheme and a multi-time hash-based signatures scheme, respectively.

Described herein are exemplary systems and methods to implement accelerators for post-quantum cryptography secure hash-based signature algorithms. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

As described briefly above, existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. The eXtended Merkle signature scheme (XMSS) and/or an eXtended Merkle many time signature scheme (XMSS-MT) are hash-based signature schemes that can protect against attacks by quantum computers. As used herein, the term XMSS shall refer to both the XMSS scheme and the XMSS-MT scheme.

An XMSS signature process implements a hash-based signature scheme using a one-time signature scheme such as a Winternitz one-time signature (WOTS) or a derivative there of (e.g., WOTS+) in combination with a secure hash algorithm (SHA) such as SHA2-256 as the primary underlying hash function. In some examples the XMSS signature/verification scheme may also use one or more of SHA2-512, SHA3-SHAKE-256 or SHA3-SHAKE-512 as secure hash functions. XMSS-specific hash functions include a Pseudo-Random Function (PRF), a chain hash (F), a tree hash (H) and message hash function ($H_{msg}$). As used herein, the term WOTS shall refer to the WOTS signature scheme and or a derivative scheme such as WOTS+.

The Leighton/Micali signature (LMS) scheme is another hash-based signature scheme that uses Leighton/Micali one-time signatures (LM-OTS) as the one-time signature building block. LMS signatures are based on a SHA2-256 hash function.

An XMSS signature process comprises three major operations. The first major operation receives an input message (M) and a private key (sk) and utilizes a one-time signature algorithm (e.g., WOTS+) to generate a message representative (M') that encodes a public key (pk). In a 128-bit post quantum security implementation the input message M is subjected to a hash function and then divided into 67 message components (n bytes each), each of which are subjected to a hash chain function to generate the a corresponding 67 components of the digital signature. Each chain function invokes a series of underlying secure hash algorithms (SHA).

The second major operation is an L-Tree computation, which combines WOTS+ (or WOTS) public key components (n-bytes each) and produces a single n-byte value. For example, in the 128-bit post-quantum security there are 67 public key components, each of which invokes an underlying secure hash algorithm (SHA) that is performed on an input block.

The third major operation is a tree-hash operation, which constructs a Merkle tree. In an XMSS verification, an authentication path that is provided as part of the signature and the output of L-tree operation is processed by a tree-hash operation to generate the root node of the Merkle tree, which should correspond to the XMSS public key. For XMSS verification with 128-bit post-quantum security, traversing the Merkle tree comprises executing secure hash operations. In an XMSS verification, the output of the Tree-hash operation is compared with the known public key. If they match then the signature is accepted. By contrast, if they do not match then the signature is rejected.

The XMSS signature process is computationally expensive. An XMSS signature process invokes hundreds, or even thousands, of cycles of hash computations. Subject matter described herein addresses these and other issues by providing systems and methods to implement accelerators for post-quantum cryptography secure XMSS and LMS hash-based signing and verification.

Post-Quantum Cryptography Overview

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Although any post-quantum cryptography could be built on the current cryptography, the novel approach would need to be intelligent, fast, and precise enough to resist and defeat any attacks by quantum computers Today's PQC is mostly focused on the following approaches: 1) hash-based cryptography based on Merkle's hash tree public-key signature system of 1979, which is built upon a one-message-signature idea of Lamport and Diffie; 2) code-based cryptography, such as McEliece's hidden-Goppa-code public-key encryption system; 3) lattice-based cryptography based on Hoffstein-Pipher-Silverman public-key-encryption system of 1998; 4) multivariate-quadratic equations cryptography based on Patarin's HFE public-key-signature system of 1996 that is further based on the Matumoto-Imai proposal; 5) supersingular elliptical curve isogeny cryptography that relies on supersingular elliptic curves and supersingular isogeny graphs; and 6) symmetric key quantum resistance.

Figure 1B:
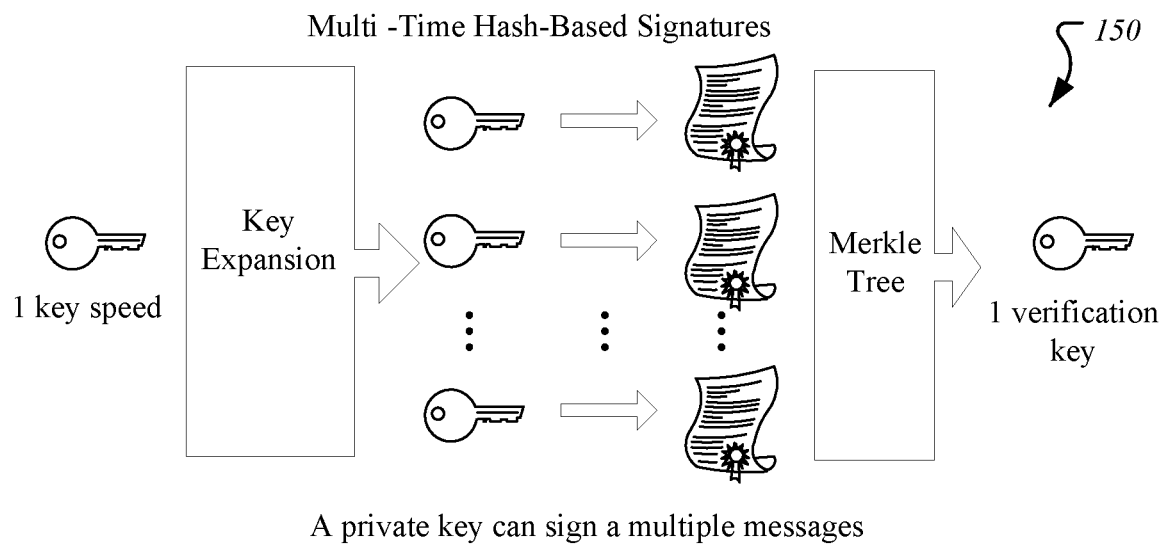

FIGS. 1A and 1B illustrate a one-time hash-based signatures scheme and a multi-time hash-based signatures scheme, respectively. As aforesaid, hash-based cryptography is based on cryptographic systems like Lamport signatures, Merkle Signatures, extended Merkle signature scheme (XMSS), and SPHINCs scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessarily basic ingredients to counter the quantum counting and post-quantum computing challenges. HBS schemes are regarded as fast signature algorithms working with fast platform secured-boot, which is regarded as the most resistant to quantum and post-quantum computing attacks.

For example, as illustrated with respect to FIG. 1A, a scheme of HBS is shown that uses Merkle trees along with a one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a private key can sign multiple messages.

Figure 2A:
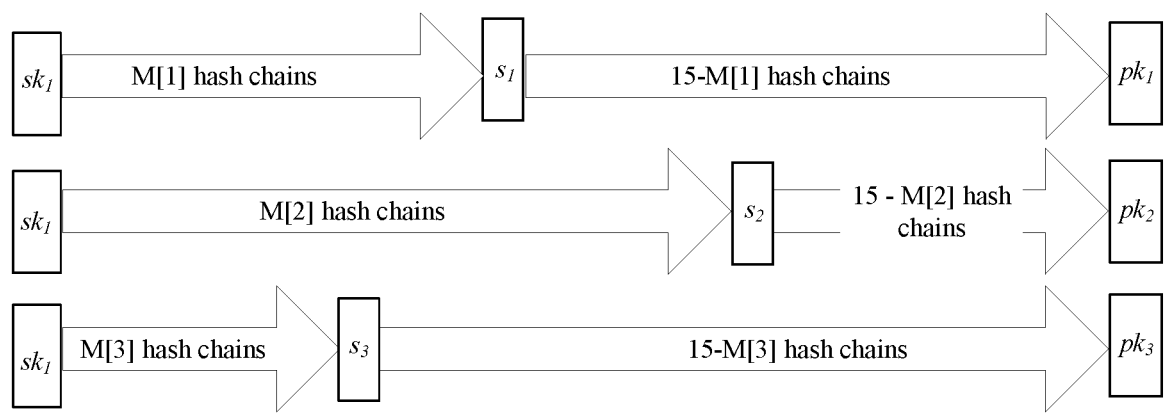
FIGS. 2A-2B are schematic illustrations of a one-time signature scheme and a multi-time signature scheme, respectively.
Figure 2A:
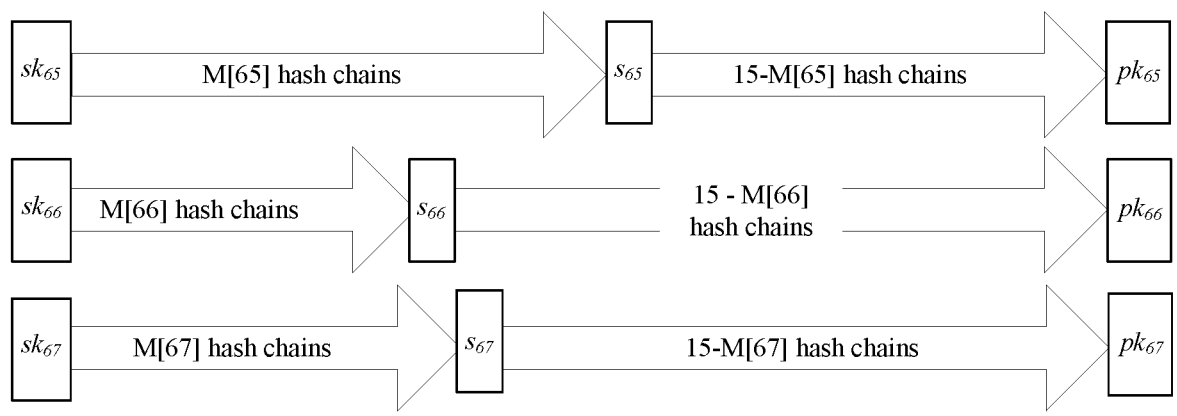
Figure 2B:
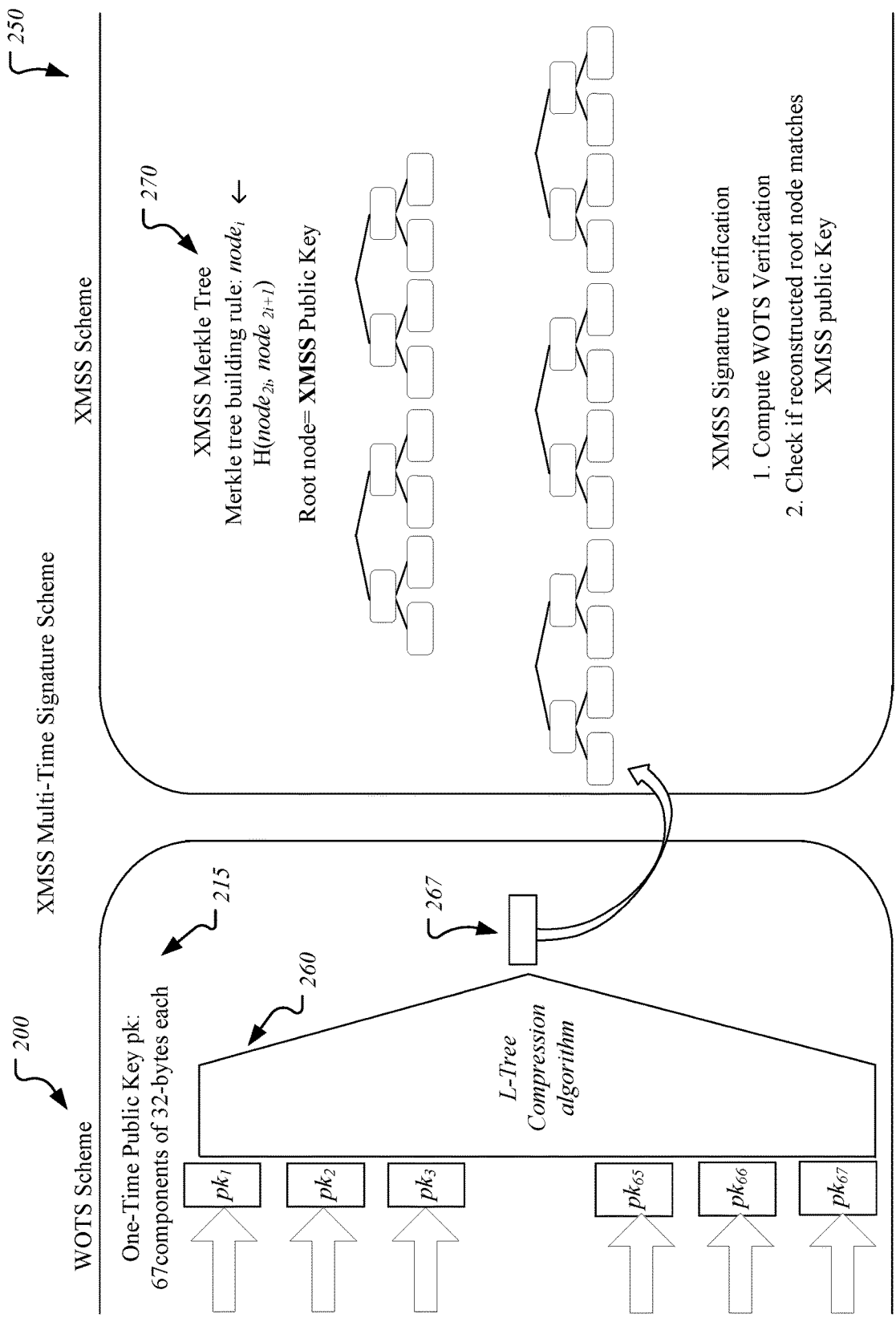

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS scheme 200, which was offered by Robert Winternitz of Stanford Mathematics Department publishing as hw(x) as opposed to h(x)|h(y), while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each.

FIG. 2B illustrates XMSS MTS scheme 250 that allows for a combination of WOTS scheme 200 of FIG. 2A and XMSS scheme 255 having XMSS Merkle tree. As discussed previously with respect to FIG. 2A, WOTs scheme 200 is based on a one-time public key, pk, 215, having 67 components of 32 bytes each, that is then put through L-Tree compression algorithm 260 to offer WOTS compressed pk 265 to take a place in the XMSS Merkle tree of XMSS scheme 255. It is contemplated that XMSS signature verification may include computing WOTS verification and checking to determine whether a reconstructed root node matches the XMSS public key, such as root node=XMSS public key.

Accelerators for Post-Quantum Cryptography

Figure 3:
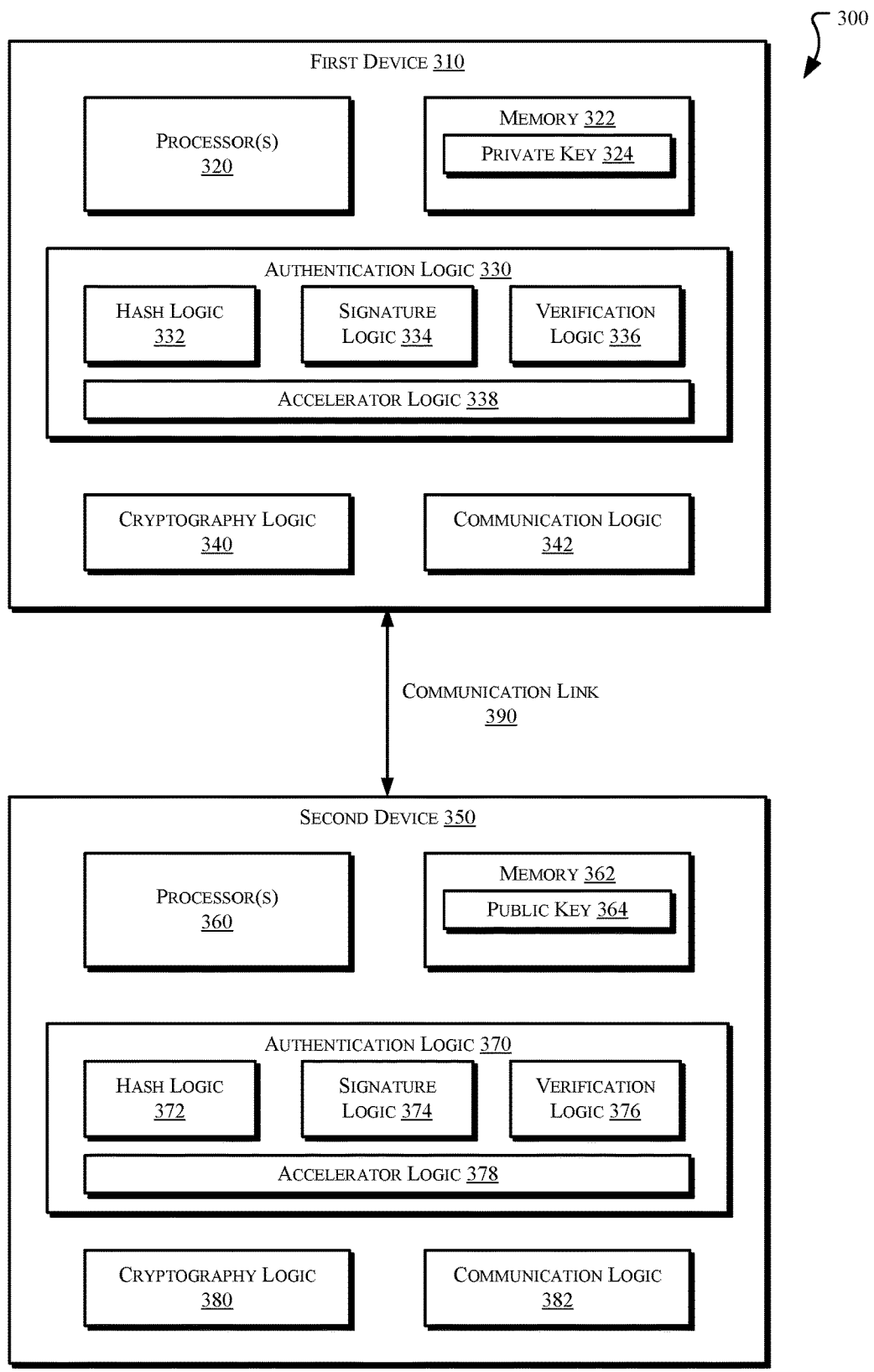
FIG. 3 is a schematic illustration of a signing device and a verifying device, in accordance with some examples.

FIG. 3 is a schematic illustration of a high-level architecture of a secure environment 300 that includes a first device 310 and a second device 350, in accordance with some examples. Referring to FIG. 3, each of the first device 310 and the second device 350 may be embodied as any type of computing device capable of performing the functions described herein. For example, in some embodiments, each of the first device 310 and the second device 350 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

First device 310 includes one or more processor(s) 320 and a memory 322 to store a private key 324. The processor(s) 320 may be embodied as any type of processor capable of performing the functions described herein. For example, the processor(s) 320 may be embodied as a single or multi-core processor(s), digital signal processor, microcontroller, or other processor or processing/controlling circuit. Similarly, the memory 322 may be embodied as any type of volatile or non-volatile memory or data storage capable of performing the functions described herein. In operation, the memory 322 may store various data and software used during operation of the first device 310 such as operating systems, applications, programs, libraries, and drivers. The memory 322 is communicatively coupled to the processor(s) 320. In some examples the private key 324 may reside in a secure memory that may be part memory 322 or may be separate from memory 322.

First device 310 further comprises authentication logic 330 which includes memory 332, signature logic, and verification logic 336. Hash logic 332 is configured to hash (i.e., to apply a hash function to) a message (M) to generate a hash value (m') of the message M. Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

Signature logic 332 may be configured to generate a signature to be transmitted, i.e., a transmitted signature and/or to verify a signature. In instances in which the first device 310 is the signing device, the transmitted signature may include a number, L, of transmitted signature elements with each transmitted signature element corresponding to a respective message element. For example, for each message element, $m_i$, signature logic 332 may be configured to perform a selected signature operation on each private key element, $s_{ki}$ of the private key, sk, a respective number of times related to a value of each message element, $m_i$ included in the message representative m'. For example, signature logic 332 may be configured to apply a selected hash function to a corresponding private key element, $s_{ki}$, $m_i$ times. In another example, signature logic 332 may be configured to apply a selected chain function (that contains a hash function) to a corresponding private key element, $s_{ki}$, $m_i$ times. The selected signature operations may, thus, correspond to a selected hash-based signature scheme.

Hash-based signature schemes may include, but are not limited to, a Winternitz (W) one time signature (OTS) scheme, an enhanced Winternitz OTS scheme (e.g., WOTS+), a Merkle many time signature scheme, an extended Merkle signature scheme (XMSS) and/or an extended Merkle multiple tree signature scheme (XMSS-MT), etc. Hash functions may include, but are not limited to SHA2-256 and/or SHA3-256, etc. For example, XMSS and/or XMSS-MT may comply or be compatible with one or more Internet Engineering Task Force (IETF®) informational draft Internet notes, e.g., draft draft-irtf-cfrg-xmss-hash-based-signatures-00, titled "XMSS: Extended Hash-Based Signatures, released April 2015, by the Internet Research Task Force, Crypto Forum Research Group of the IETF® and/or later and/or related versions of this informational draft, such as draft draft-irtf-cfrg-xmss-hash-based-signatures-06, released June 2016.

Winternitz OTS is configured to generate a signature and to verify a received signature utilizing a hash function. Winternitz OTS is further configured to use the private key and, thus, each private key element, $s_{ki}$, one time. For example, Winternitz OTS may be configured to apply a hash function to each private key element, $m_i$ or $N-m_i$ times to generate a signature and to apply the hash function to each received message element $N-m_i'$ or $m_i'$, times to generate a corresponding verification signature element. The Merkle many time signature scheme is a hash-based signature scheme that utilizes an OTS and may use a public key more than one time. For example, the Merkle signature scheme may utilize Winternitz OTS as the one-time signature scheme. WOTS+ is configured to utilize a family of hash functions and a chain function.

XMSS, WOTS+ and XMSS-MT are examples of hash-based signature schemes that utilize chain functions. Each chain function is configured to encapsulate a number of calls to a hash function and may further perform additional operations. The number of calls to the hash function included in the chain function may be fixed. Chain functions may improve security of an associated hash-based signature scheme. Hash-based signature balancing, as described herein, may similarly balance chain function operations.

Cryptography logic 340 is configured to perform various cryptographic and/or security functions on behalf of the signing device 310. In some embodiments, the cryptography logic 340 may be embodied as a cryptographic engine, an independent security co-processor of the signing device 310, a cryptographic accelerator incorporated into the processor(s) 320, or a standalone software/firmware. In some embodiments, the cryptography logic 340 may generate and/or utilize various cryptographic keys (e.g., symmetric/asymmetric cryptographic keys) to facilitate encryption, decryption, signing, and/or signature verification. Additionally, in some embodiments, the cryptography logic 340 may facilitate to establish a secure connection with remote devices over communication link. It should further be appreciated that, in some embodiments, the cryptography module 340 and/or another module of the first device 310 may establish a trusted execution environment or secure enclave within which a portion of the data described herein may be stored and/or a number of the functions described herein may be performed.

After the signature is generated as described above, the message, M, and signature may then be sent by first device 310, e.g., via communication logic 342, to second device 350 via network communication link 390. In an embodiment, the message, M, may not be encrypted prior to transmission. In another embodiment, the message, M, may be encrypted prior to transmission. For example, the message, M, may be encrypted by cryptography logic 340 to produce an encrypted message.

Second device 350 may also include one or more processors 360 and a memory 362 to store a public key 364. As described above, the processor(s) 360 may be embodied as any type of processor capable of performing the functions described herein. For example, the processor(s) 360 may be embodied as a single or multi-core processor(s), digital signal processor, microcontroller, or other processor or processing/controlling circuit. Similarly, the memory 362 may be embodied as any type of volatile or non-volatile memory or data storage capable of performing the functions described herein. In operation, the memory 362 may store various data and software used during operation of the second device 350 such as operating systems, applications, programs, libraries, and drivers. The memory 362 is communicatively coupled to the processor(s) 360.

In some examples the public key 364 may be provided to verifier device 350 in a previous exchange. The public key, $p_k$, is configured to contain a number L of public key elements, i.e., $p_k=[p_{k1}, \ldots, p_{kL}]$. The public key 364 may be stored, for example, to memory 362.

Second device 350 further comprises authentication logic 370 which includes hash logic 372, signature logic, and verification logic 376. As described above, hash logic 372 is configured to hash (i.e., to apply a hash function to) a message (M) to generate a hash message (m'). Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

In instances in which the second device is the verifying device, authentication logic 370 is configured to generate a verification signature based, at least in part, on the signature received from the first device and based, at least in part, on the received message representative (m'). For example, authentication logic 370 may configured to perform the same signature operations, i.e., apply the same hash function or chain function as applied by hash logic 332 of authentication logic 330, to each received message element a number, N-$m_{i'}$ (or $m_{i'}$), times to yield a verification message element. Whether a verification signature, i.e., each of the L verification message elements, corresponds to a corresponding public key element, $p_{ki}$, may then be determined. For example, verification logic 370 may be configured to compare each verification message element to the corresponding public key element, $p_{ki}$. If each of the verification message element matches the corresponding public key element, $p_{ki}$, then the verification corresponds to success. In other words, if all of the verification message elements match the public key elements, $p_{k1}, \ldots, p_{kL}$, then the verification corresponds to success. If any verification message element does not match the corresponding public key element, $p_{ki}$, then the verification corresponds to failure.

As described in greater detail below, in some examples the authentication logic 330 of the first device 310 includes one or more accelerators 338 that cooperate with the hash logic 332, signature logic 334 and/or verification logic 336 to accelerate authentication operations. Similarly, in some examples the authentication logic 370 of the second device 310 includes one or more accelerators 378 that cooperate with the hash logic 372, signature logic 374 and/or verification logic 376 to accelerate authentication operations. Examples of accelerators are described in the following paragraphs and with reference to the accompanying drawings.

The various modules of the environment 300 may be embodied as hardware, software, firmware, or a combination thereof. For example, the various modules, logic, and other components of the environment 300 may form a portion of, or otherwise be established by, the processor(s) 320 of first device 310 or processor(s) 360 of second device 350, or other hardware components of the devices As such, in some embodiments, one or more of the modules of the environment 300 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another.

Figure 4A:
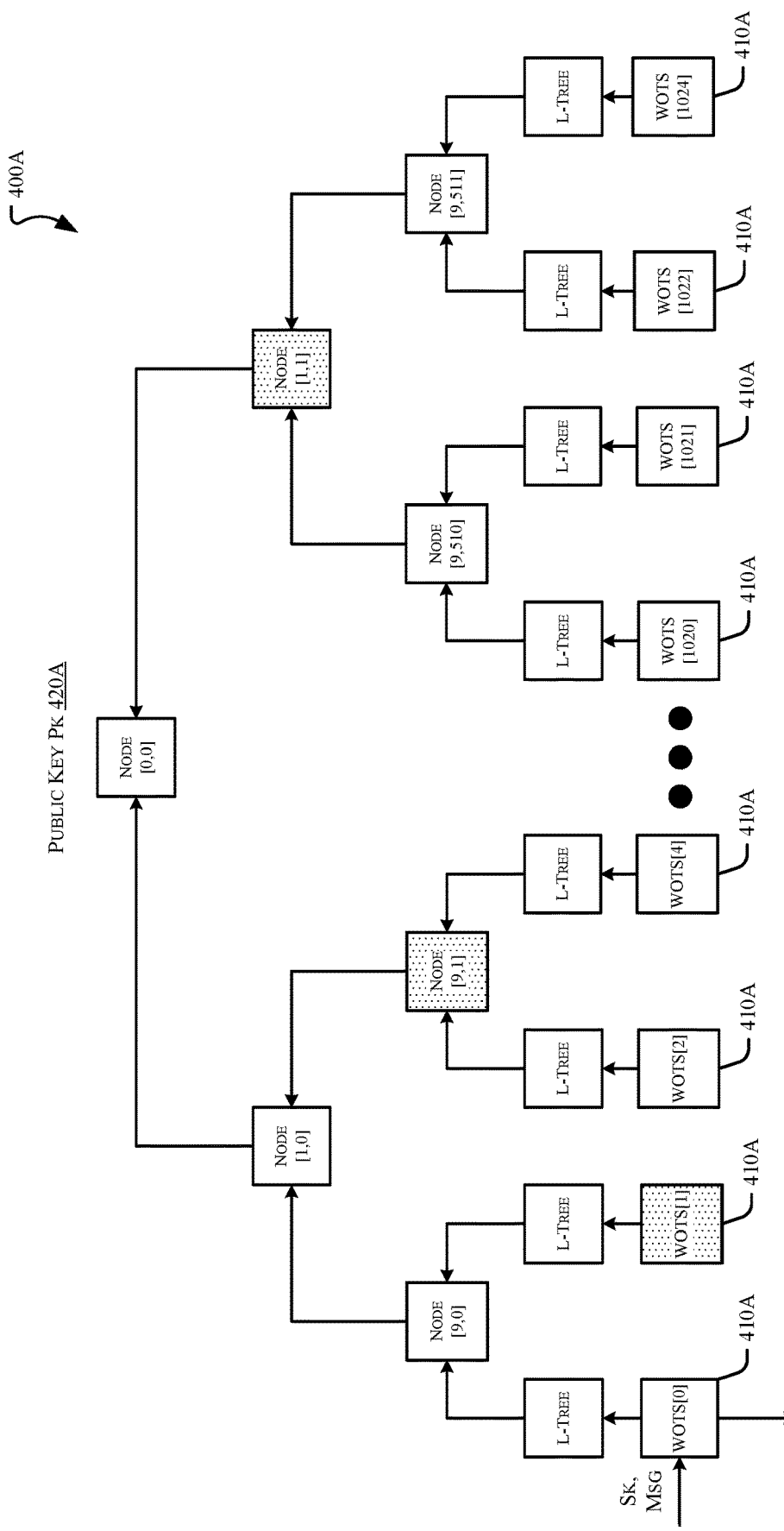
FIG. 4A is a schematic illustration of a Merkle tree structure, in accordance with some examples.

FIG. 4A is a schematic illustration of a Merkle tree structure illustrating signing operations, in accordance with some examples. Referring to FIG. 4A, an XMSS signing operation requires the construction of a Merkle tree 400A using the local public key from each leaf WOTS node 410 to generate a global public key (PK) 420. In some examples the authentication path and the root node value can be computed off-line such that these operations do not limit performance. Each WOTS node 410 has a unique secret key, "sk" which is used to sign a message only once. The XMSS signature consists of a signature generated for the input message and an authentication path of intermediate tree nodes to construct the root of the Merkle tree.

Figure 4B:
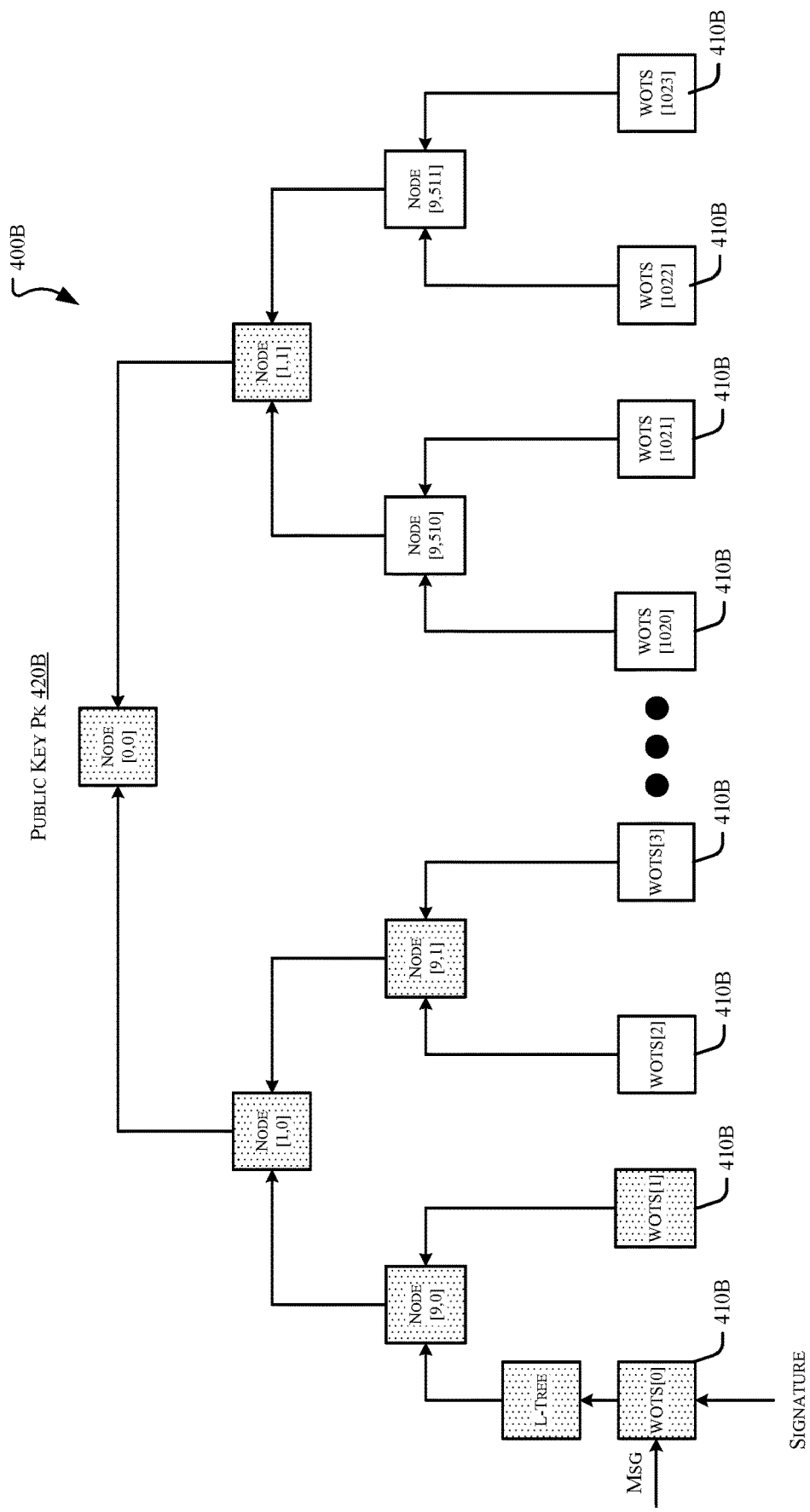
FIG. 4B is a schematic illustration of a Merkle tree structure, in accordance with some examples.

FIG. 4B is a schematic illustration of a Merkle tree structure 400B during verification, in accordance with some examples. During verification, the input message and signature are used to compute the local public key 420B of the WOTS node, which is further used to compute the tree root value using the authentication path. A successful verification will match the computed tree root value to the public key PK shared by the signing entity. The WOTS and L-Tree operations constitute on a significant portion of XMSS sign/verify latency respectively, thus defining the overall performance of the authentication system. Described herein are various pre-computation techniques which may be implemented to speed-up WOTS and L-Tree operations, thereby improving XMSS performance. The techniques are applicable to the other hash options and scale well for both software and hardware implementations.

Figure 5:
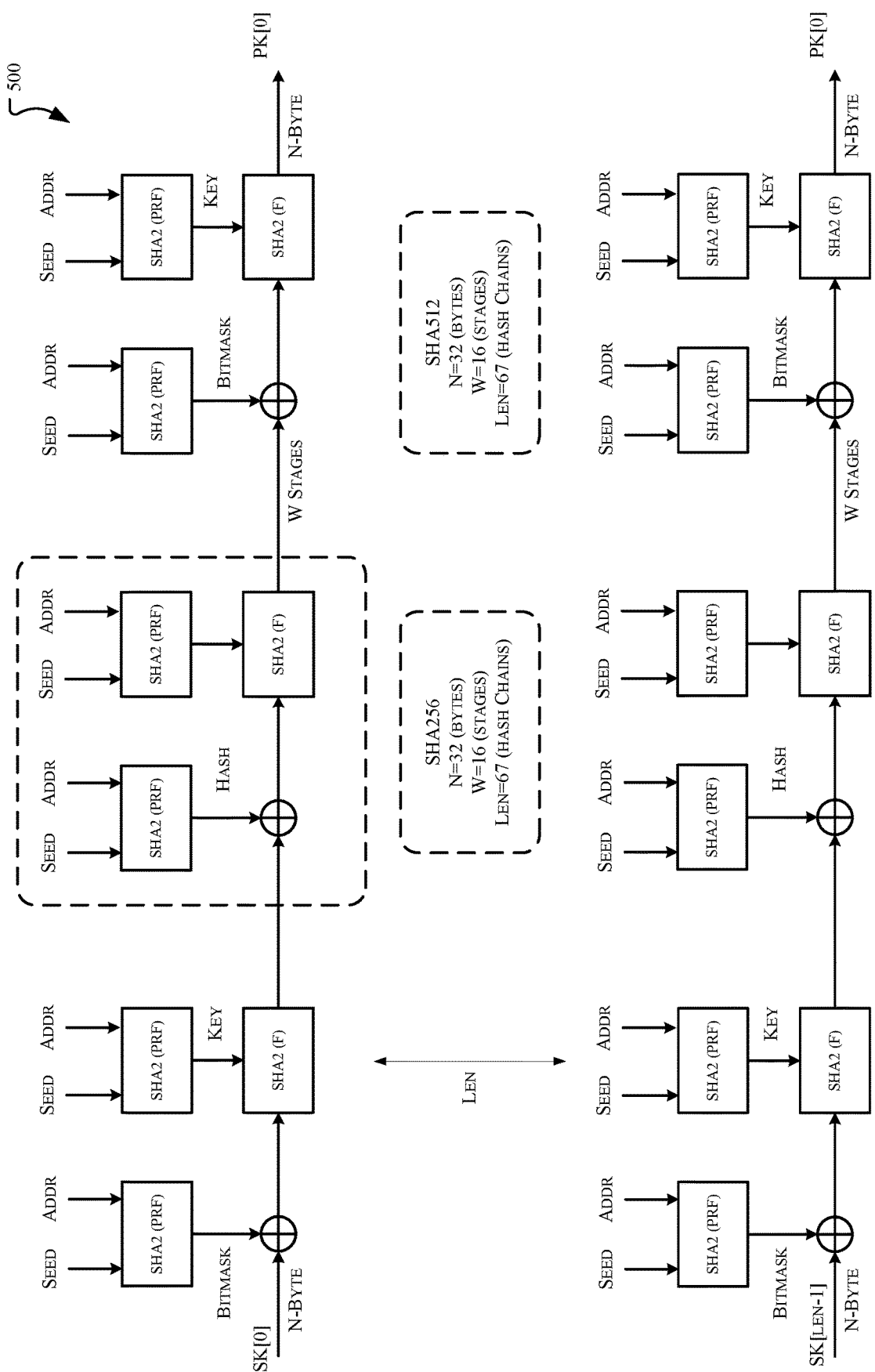
FIG. 5 is a schematic illustration of a compute blocks in an architecture to implement a signature algorithm, in accordance with some examples.

FIG. 5 is a schematic illustration of a compute blocks in an architecture 500 to implement a signature algorithm, in accordance with some examples. Referring to FIG. 5, the WOTS+ operation involves 67 parallel chains of 16 SHA2-256 HASH functions, each with the secret key sk[66:0] as input. Each HASH operation in the chain consists of 2 pseudo-random functions (PRF) using SHA2-256 to generate a bitmask and a key. The bitmask is XOR-ed with the previous hash and concatenated with the key as input message to a 3rd SHA2-256 hash operation. The 67×32-byte WOTS public key pk[66:0] is generated by hashing secret key sk across the 67 hash chains.

Figure 6A:
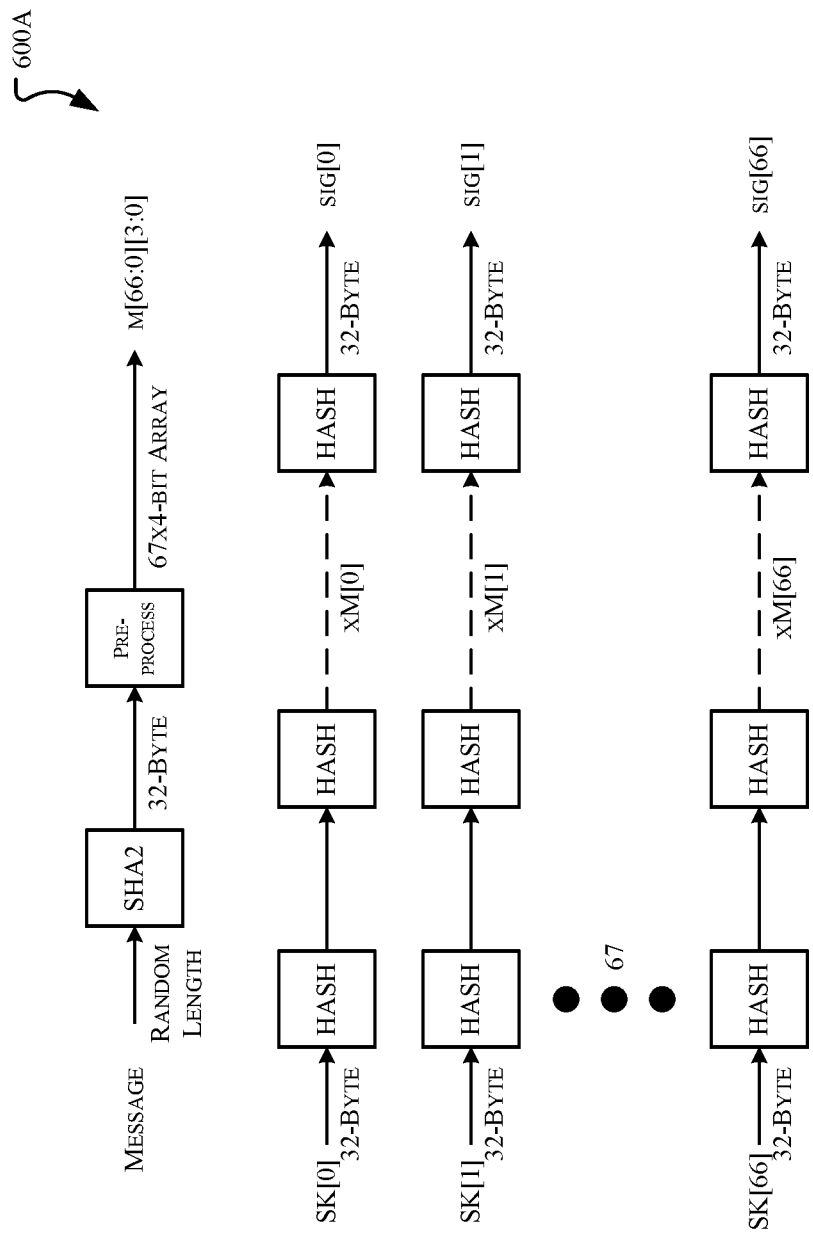
FIG. 6A is a schematic illustration of a compute blocks in an architecture to implement signature generation in a signature algorithm, in accordance with some examples.

FIG. 6A is a schematic illustration of a compute blocks in an architecture 600A to implement signature generation in a signature algorithm, in accordance with some examples. As illustrated in FIG. 6A, for message signing, the input message is hashed and pre-processed to compute a 67×4-bit value, which is used as an index to choose an intermediate hash value in each chain.

Figure 6B:
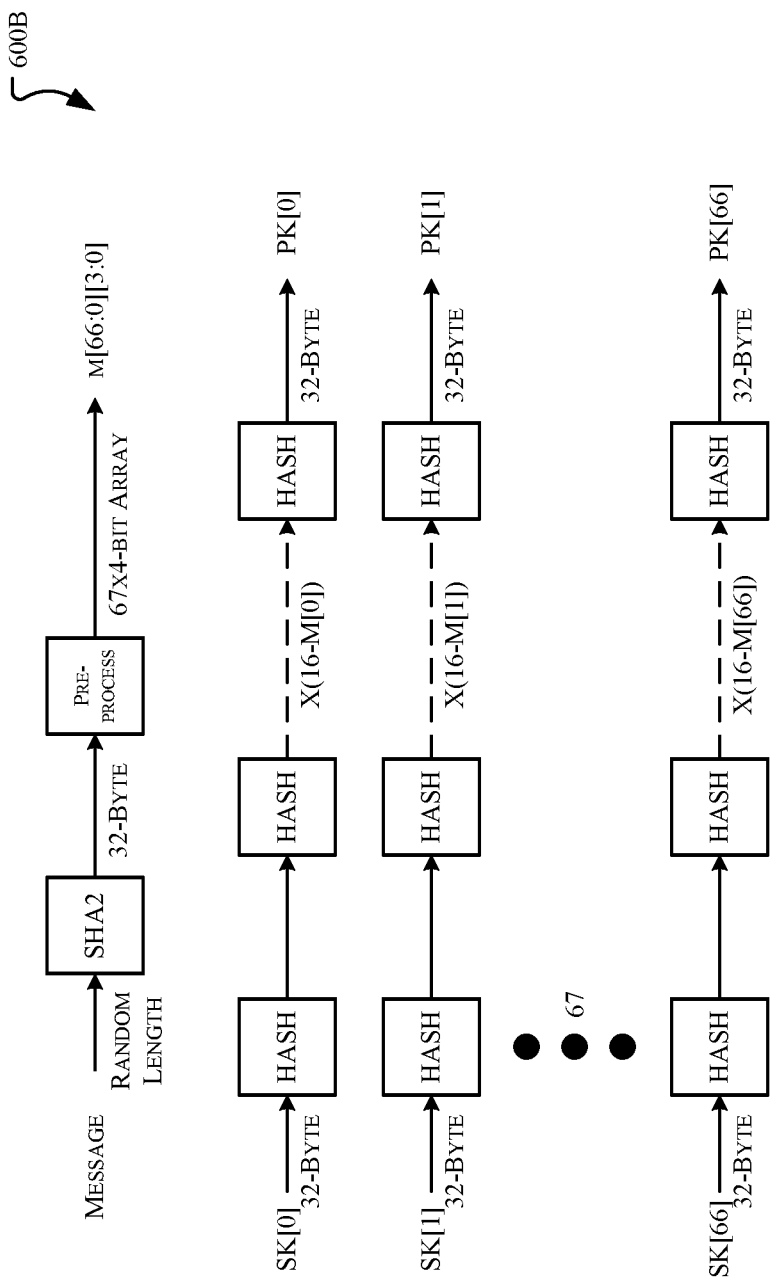
FIG. 6B is a schematic illustration of a compute blocks in an architecture to implement signature verification in a verification algorithm, in accordance with some examples.

FIG. 6B is a schematic illustration of a compute blocks in an architecture 600B to implement signature verification in a verification algorithm, in accordance with some examples. Referring to FIG. 6B, during verification, the message is again hashed to compute the signature indices and compute the remaining HASH operations in each chain to compute the WOTS public key pk. This value and the authentication path are used to compute the root of the Merkle tree and compare with the shared public key PK to verify the message.

Figure 7:
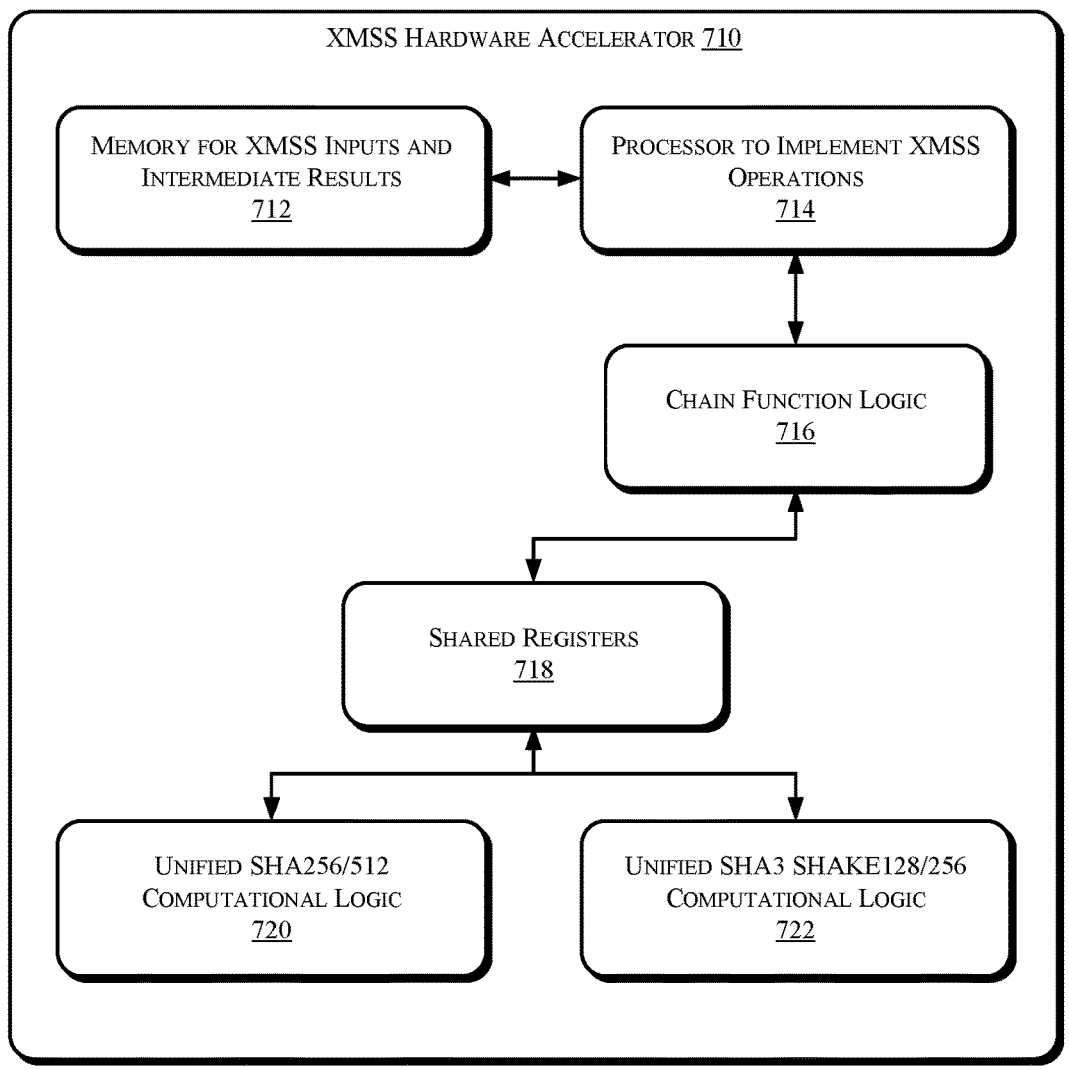
FIG. 7 is a schematic illustration of compute blocks in an architecture to implement a hardware accelerator, in accordance with some examples.

FIG. 7 is a schematic illustration of compute blocks in an architecture 700A to implement a HASH algorithm, in accordance with some examples. Referring to FIG. 7A, in some examples a XMSS hardware accelerator 710 may comprise a computer readable memory 712 which may be used to store XMSS inputs and intermediate results for the XMSS operations, one or more processors to implement XMSS operations, a chain function logic module 716, and a set of registers 716 that are shared between a unified SHA256/512 computational logic module 720 and a unified SHA3 SHAKE128/256 computational logic module 722.

As described below, the SHA256/512 computational logic has a novel unified configurable architecture that enables single 64-bit SHA2-512 operation or two parallel 32-bit SHA2-256 operations, which enables a signifcant speedup for XMSS operations in SHA2-256 mode when compared to a traditional SHA2 hardware-based XMSS accelerator.

Figure 8:
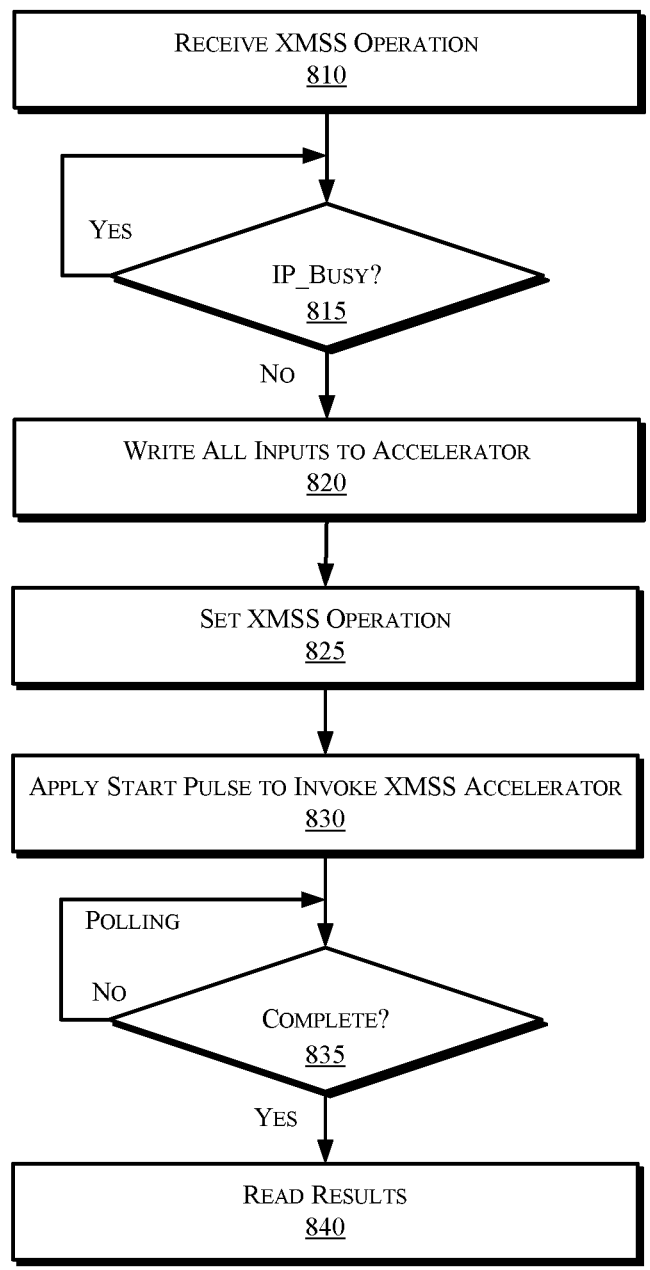
FIG. 8 is a flowchart illustrating operations in a method to implement a hardware accelerator, in accordance with some examples.
Figure 9:
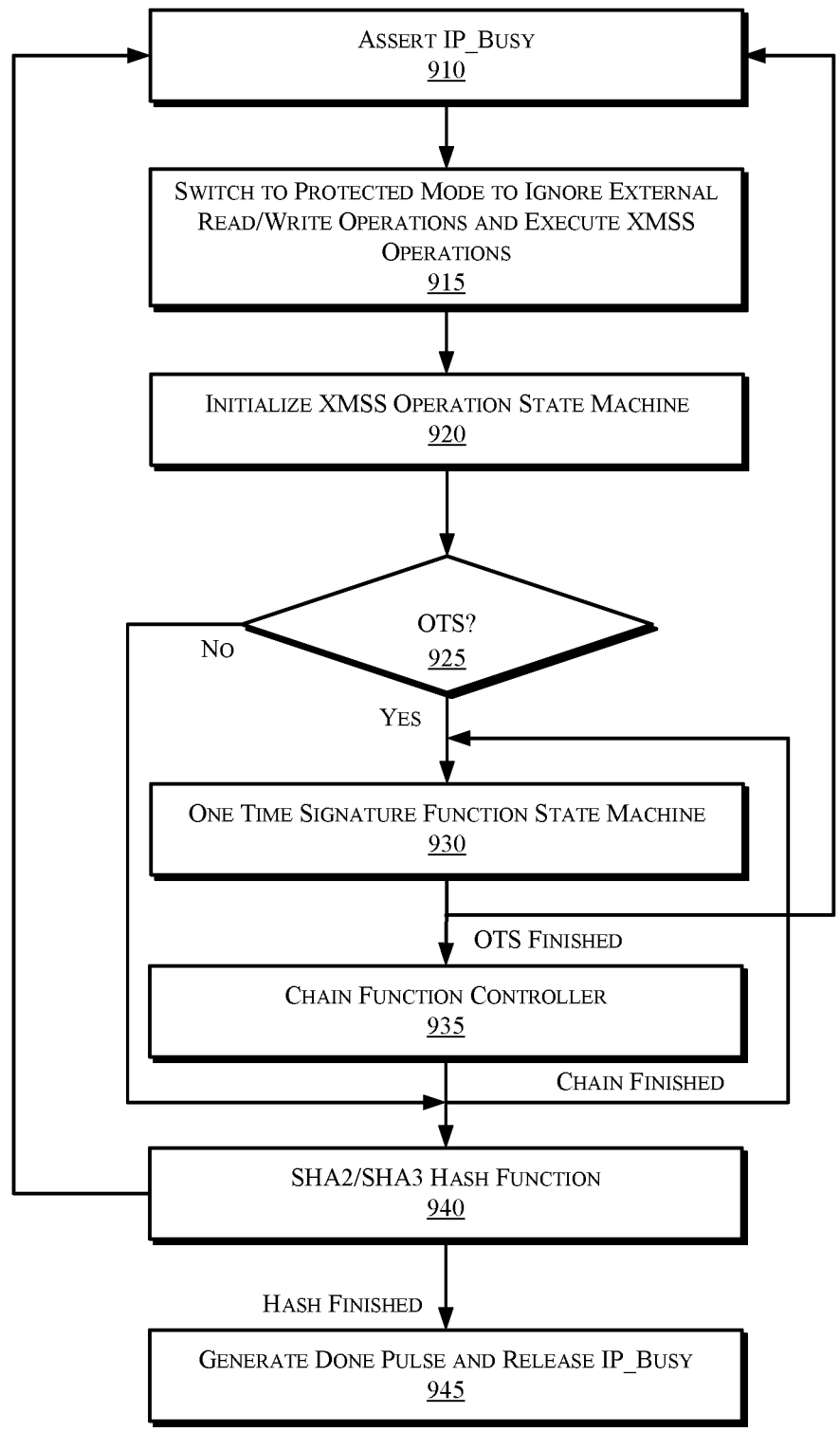
FIG. 9 is a flowchart illustrating operations in a method implemented by a hardware accelerator, in accordance with some examples.

FIG. 8 is a flowchart illustrating operations in a method implemented by a hardware accelerator, in accordance with some examples. In particular, FIG. 9 illustrates operations which may be implemented by a host process in a method to implement a hardware accelerator. In some examples the operations depicted in FIG. 8 may be implemented by a processor, e.g., one or more of the processors 320 in first device or the processor(s) in the second device 350. Referring to FIG. 8, at operation 810 an XMSS operation is received. If, at operation 815, the XMSS hardware accelerator is asserting an IP_Busy status then control remains at operation 815 and the host process continues to monitor the status of the XMSS hardware accelerator 710.

By contrast, if at operation 815 the XMSS hardware accelerator 710 is not asserting an IP_Busy status then control passes to operation 820 and the host process writes the inputs to the XMSS hardware accelerator 710. At operation 825 the host process sets parameters of the XMSS operation, e.g., Key gen, Sign, Verify etc) and the underlying hash function (i.e., SHA256, SHA512, SHAKE128 or SHAKE256). At operation 830 the host process applies a start pulse to the XMSS accelerator 710.

At operation 835 the host process monitors the status of the XMSS accelerator 710 to determine whether the XMSS accelerator 710 has completed its operations. If, at operation 710, the XMSS accelerator 710 has not completed its operations then the host process continues to poll the XMSS accelerator 710. By contrast, if at operation 710 the XMSS accelerator has completed its operations then control passes to operation 840 and the host process reads the results of the XMSS accelerator 710.

FIG. 9 is a flowchart illustrating operations in a method implemented by a hardware accelerator, in accordance with some examples. In some examples the operations depicted in FIG. 9 may be implemented by a processor, e.g., processor 714 in the XMSS hardware accelerator 710. Referring to FIG. 9, at operation 910 the XMSS hardware accelerator 710 asserts an IP_Busy status and at operation 915 the XMSS hardware accelerator 710 switches to a protected mode in which it ignores external read/write operations and executes XMSS operations.

At operation 920 the XMSS operation state machine is initialized. At operation 925 it is determined whether the XMSS operation utilizes a one-time signature operation. If, at operation 925 the XMSS operation does not utilize a one-time signature operation then control passes to operation 940. By contrast, if at operation 925 the XMSS operation utilizes a one-time signature operation then control passes to operation 930 and a one-time signature function state machine is invoked to implement one-time signature operations repeatedly until they one-time signature operations are finished. At operation 935 a chain function controller is invoked to implement chain function operations until the chain function operations are completed.

At operation 940 the XMSS hardware accelerator implements one of a SHA2 has function or a SHA3 hash function based at least in part on the parameters implemented in operation 825. When the XMSS accelerator 710 completes the hash function control passes to operation 945 and the XMSS accelerator 710 generates a done pulse and releases the IP_Busy status such that when the host process polls the XMSS accelerator 710 at operation 835 the host process receives an indication that the XMSS accelerator 710 is finished and the host process can read the results at operation 840.

Figure 10:
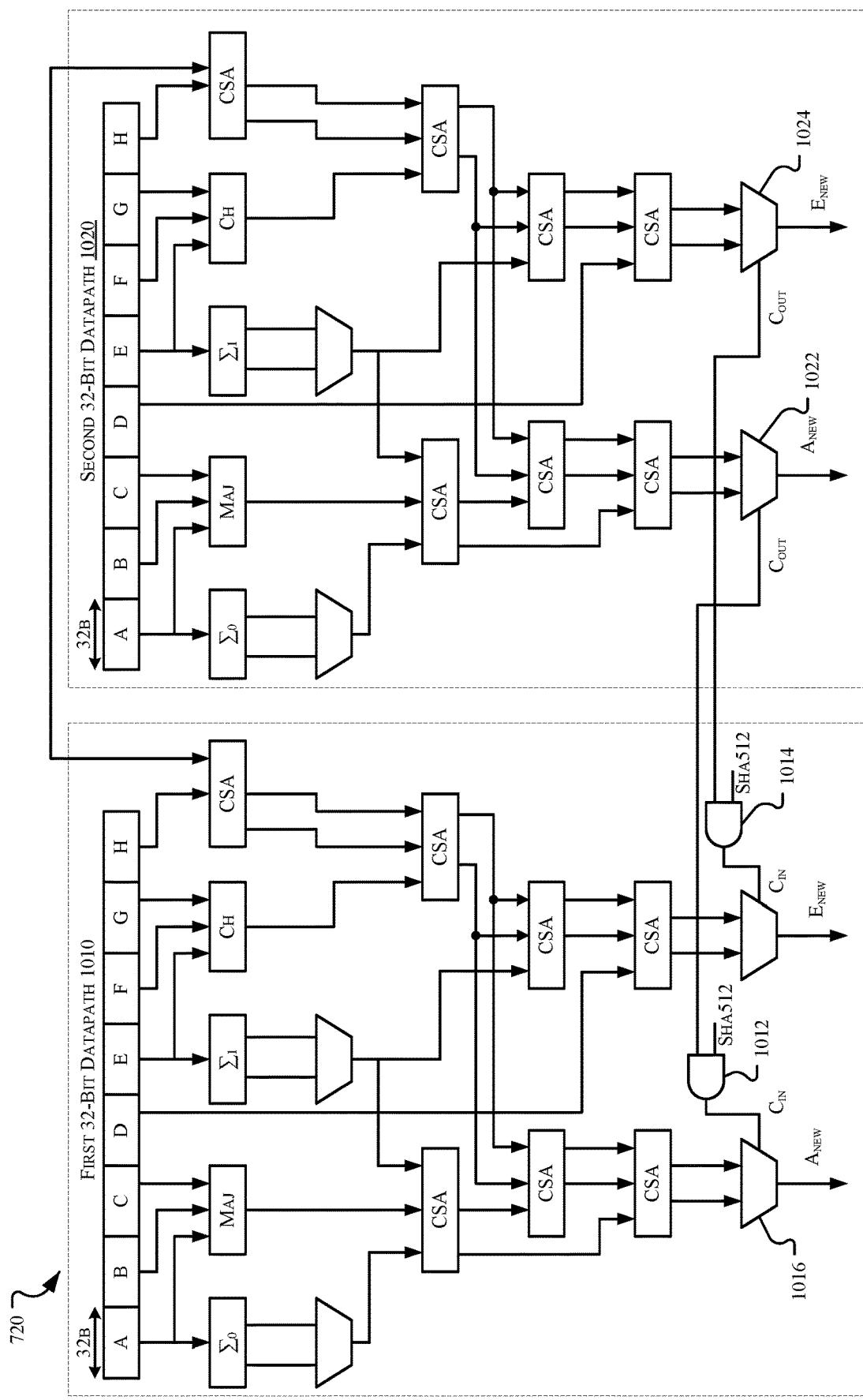
FIG. 10 is a schematic illustration of compute blocks in an architecture to implement a hardware accelerator, in accordance with some examples.

FIG. 10 is a schematic illustration of compute blocks in an architecture to implement a hardware accelerator, in accordance with some examples. More particularly, FIG. 10 illustrates compute blocks of a unified SHA256/512 computational logic module 720 as depicted in FIG. 7. Referring to FIG. 10, the unified SHA256/512 computational logic consists of first 32-bit data path 1010 and a second 32-bit data path 1020 which are configurable to define a 64-bit datapath to perform 1×SHA512 operations or 2×SHA256 operations. A conventional unified SHA2-256/512 hardware accelerator uses a common 64-bit datapath that is shared between both the SHA2 modes. Common use models of SHA2 perform round operations serially, making use of only half of the datapath to perform 32b SHA2-256 operations.

XMSS provides an opportunity to perform multiple SHA2-256 operations in parallel during both WOTS and L-Tree operations. The unified SHA2 computational logic depicted in FIG. 10 may be configured to operate as a single-round in SHA-512 mode or as two parallel rounds in SHA-256 mode. For example, in SHA256 mode a shared constant generation technique may be implemented to provide the round constants to allow the first datapath 1010 and the second datapath 1020 to operate in parallel.

A conditional carry propagation circuitry may be used to re-configure the shared 64-bit completion adders as two 32-bit adders. In the example depicted in FIG. 10, the conditional carry propagation circuitry may comprise a first and gate 1012 and a second and gate 1014. The first and gate 1012 receives an input indicating whether the SHA2 computational logic module is operating in SHA-512 mode and an output signal from multiplexer 1022 in the second datapath 1020 and generates a control signal for the output multiplexer 1016. The second and gate 1014 receives an input indicating whether the SHA2 computational logic module 710 is operating in SHA-512 mode and an output signal from multiplexer 1024 in the second datapath 1020 and generates a control signal for the output multiplexer 1018. Thus, the SHA2 computational logic module 710 can be implemented either as 2×32-bit adders as shown in the figure or a single 64-bit adder with carry conditionally killed at the 32-bit boundary between the first datapath 1010 and the second datapath 1020. The implementation shown in FIG. 10 performs carry suppression in a ripple-carry mode. Similar carry suppression techniques can be extended to other adder architectures, such as parallel-prefix adders, as well.

Figure 11:
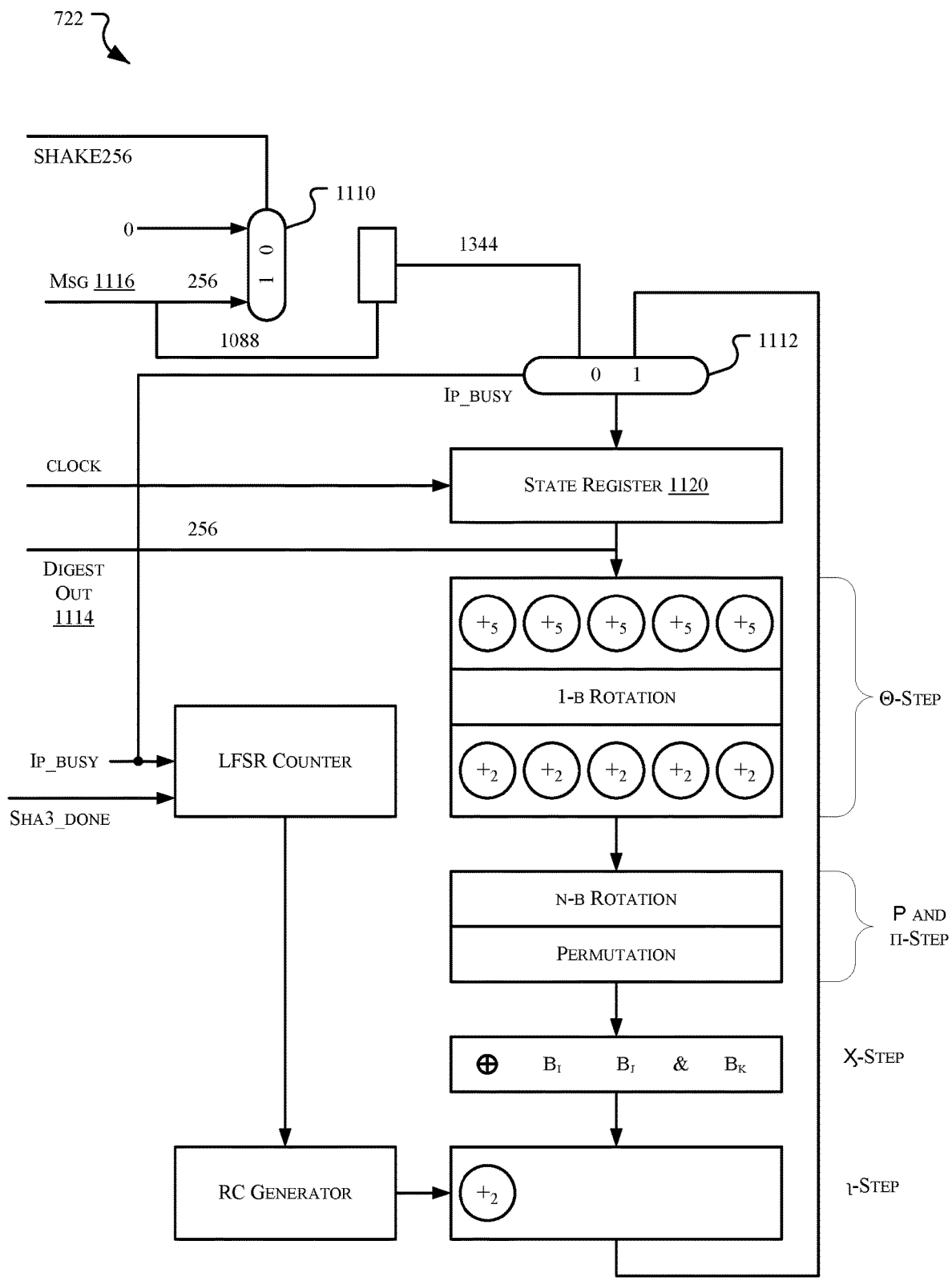
FIG. 11 is a schematic illustration of compute blocks in an architecture to implement a hardware accelerator, in accordance with some examples.

FIG. 11 is a schematic illustration of compute blocks in an architecture to implement a hardware accelerator, in accordance with some examples. FIG. 11 illustrates compute blocks of a unified SHA3 SHAKE128/256 computational logic module 722 as depicted in FIG. 7. Referring to FIG. 11, SHAKE128 and SHAKE256 are two output extended modes of SHA3 algorithm. Both are based on the same SHA3 function but have different input and output block sizes. As illustrated in FIG. 11, our unified SHAKE128/256 consists of an input multiplexer 1110 and output multiplexer 1112 which enable specific sets of input/output bits based on the mode of operation. The SHA 3 computational logic module 722 executes all 24 SHA3 rounds iteratively and generates a digest output 1114.

During execution in a SHAKE128 hash operating mode, the computational logic module 722 configures with 256-bit state, 1344-bit input block and 256-bit output. All inputs for each WOTS chain function, the hashes involved in an L-tree computation and the hash operations for a Merkle tree root node computation are fit within one input block of SHAKE128. When the unified SHA3 SHAKE128/256 computational logic unit 722 receives a start pulse it captures the input from msg port 1116 and starts SHAKE128 execution. One round of SHA3 is computed in one clock cycle by the computational logic unit 722. After one round it updates the 1600-bit state register 1120. In the following clock cycle the computational logic unit 722 computes the next round operation on the updated state value, and so on for subsequent cycles. After 24 such iterations the state register 1120 does not update and the 128-bit digest is generated through the digest out port 1114. To generate a 256-bit output, after generating first 128-bit output, the computational logic unit 722 executes for another 24 SHA3 rounds with input zero (i.e., a Squeeze) and generates the second 128-bit output of the 256-bits.

During execution in a SHAKE256 has operating mode the computational logic module 722 is configured with 512-bit state, a 1088-bit input, and a 512-bit output. In SHAKE256 mode the computational logic unit 722 can generate one 256-bit output per round. Therefore, similar to the SHAKE128 mode, it computes the first 256 bits in a first round then performs one extra squeeze for generating the second 256-bit output for computing 512-bit output for XMSS operations.

Figure 12:
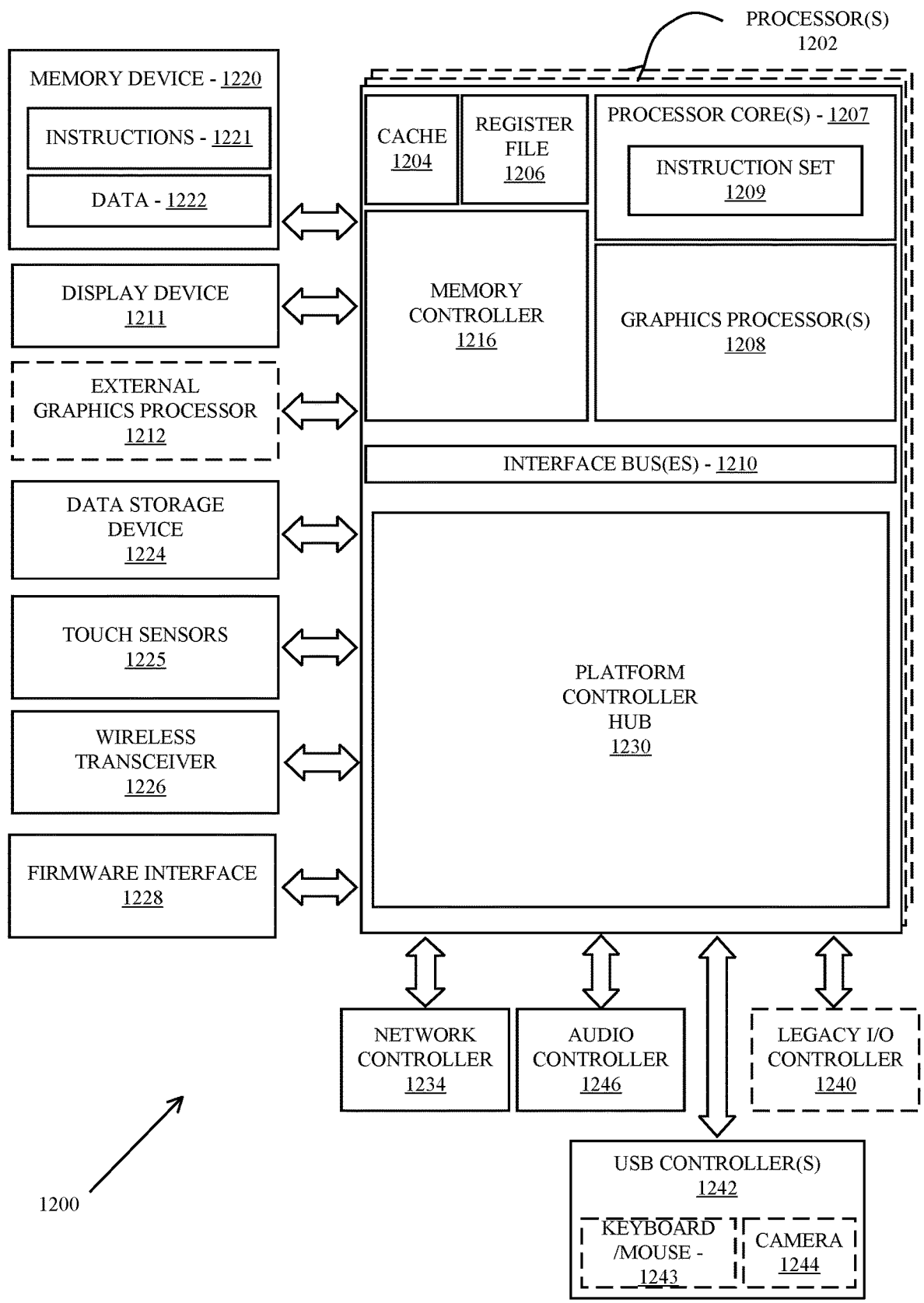
FIG. 12 is a schematic illustration of a computing architecture which may be adapted to implement a hardware accelerator in accordance with some examples.

FIG. 12 illustrates an embodiment of an exemplary computing architecture that may be suitable for implementing various embodiments as previously described. In various embodiments, the computing architecture 1200 may comprise or be implemented as part of an electronic device. In some embodiments, the computing architecture 1200 may be representative, for example of a computer system that implements one or more components of the operating environments described above. In some embodiments, computing architecture 1200 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 includes one or more processors 1202 and one or more graphics processors 1208, and may be a single processor desktop system, a multiprocessor workstation system, or a server system having a large number of processors 1202 or processor cores 1207. In on embodiment, the system 1200 is a processing platform incorporated within a system-on-a-chip (SoC or SOC) integrated circuit for use in mobile, handheld, or embedded devices.

An embodiment of system 1200 can include, or be incorporated within a server-based gaming platform, a game console, including a game and media console, a mobile gaming console, a handheld game console, or an online game console. In some embodiments system 1200 is a mobile phone, smart phone, tablet computing device or mobile Internet device. Data processing system 1200 can also include, couple with, or be integrated within a wearable device, such as a smart watch wearable device, smart eyewear device, augmented reality device, or virtual reality device. In some embodiments, data processing system 1200 is a television or set top box device having one or more processors 1202 and a graphical interface generated by one or more graphics processors 1208.

In some embodiments, the one or more processors 1202 each include one or more processor cores 1207 to process instructions which, when executed, perform operations for system and user software. In some embodiments, each of the one or more processor cores 1207 is configured to process a specific instruction set 1209. In some embodiments, instruction set 1209 may facilitate Complex Instruction Set Computing (CISC), Reduced Instruction Set Computing (RISC), or computing via a Very Long Instruction Word (VLIW). Multiple processor cores 1207 may each process a different instruction set 1209, which may include instructions to facilitate the emulation of other instruction sets. Processor core 1207 may also include other processing devices, such a Digital Signal Processor (DSP).

In some embodiments, the processor 1202 includes cache memory 1204. Depending on the architecture, the processor 1202 can have a single internal cache or multiple levels of internal cache. In some embodiments, the cache memory is shared among various components of the processor 1202. In some embodiments, the processor 1202 also uses an external cache (e.g., a Level-3 (L3) cache or Last Level Cache (LLC)) (not shown), which may be shared among processor cores 1207 using known cache coherency techniques. A register file 1206 is additionally included in processor 1202 which may include different types of registers for storing different types of data (e.g., integer registers, floating point registers, status registers, and an instruction pointer register). Some registers may be general-purpose registers, while other registers may be specific to the design of the processor 1202.

In some embodiments, one or more processor(s) 1202 are coupled with one or more interface bus(es) 1210 to transmit communication signals such as address, data, or control signals between processor 1202 and other components in the system. The interface bus 1210, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 1202 include an integrated memory controller 1216 and a platform controller hub 1230. The memory controller 1216 facilitates communication between a memory device and other components of the system 1200, while the platform controller hub (PCH) 1230 provides connections to I/O devices via a local I/O bus.

Memory device 1220 can be a dynamic random-access memory (DRAM) device, a static random-access memory (SRAM) device, flash memory device, phase-change memory device, or some other memory device having suitable performance to serve as process memory. In one embodiment the memory device 1220 can operate as system memory for the system 1200, to store data 1222 and instructions 1221 for use when the one or more processors 1202 executes an application or process. Memory controller hub 1216 also couples with an optional external graphics processor 1212, which may communicate with the one or more graphics processors 1208 in processors 1202 to perform graphics and media operations. In some embodiments a display device 1211 can connect to the processor(s) 1202. The display device 1211 can be one or more of an internal display device, as in a mobile electronic device or a laptop device or an external display device attached via a display interface (e.g., DisplayPort, etc.). In one embodiment the display device 1211 can be a head mounted display (HMD) such as a stereoscopic display device for use in virtual reality (VR) applications or augmented reality (AR) applications.

In some embodiments the platform controller hub 1230 enables peripherals to connect to memory device 1220 and processor 1202 via a high-speed I/O bus. The I/O peripherals include, but are not limited to, an audio controller 1246, a network controller 1234, a firmware interface 1228, a wireless transceiver 1226, touch sensors 1225, a data storage device 1224 (e.g., hard disk drive, flash memory, etc.). The data storage device 1224 can connect via a storage interface (e.g., SATA) or via a peripheral bus, such as a Peripheral Component Interconnect bus (e.g., PCI, PCI Express). The touch sensors 1225 can include touch screen sensors, pressure sensors, or fingerprint sensors. The wireless transceiver 1226 can be a Wi-Fi transceiver, a Bluetooth transceiver, or a mobile network transceiver such as a 3G, 4G, or Long Term Evolution (LTE) transceiver. The firmware interface 1228 enables communication with system firmware, and can be, for example, a unified extensible firmware interface (UEFI). The network controller 1234 can enable a network connection to a wired network. In some embodiments, a high-performance network controller (not shown) couples with the interface bus 1210. The audio controller 1246, in one embodiment, is a multi-channel high definition audio controller. In one embodiment the system 1200 includes an optional legacy I/O controller 1240 for coupling legacy (e.g., Personal System 2 (PS/2)) devices to the system. The platform controller hub 1230 can also connect to one or more Universal Serial Bus (USB) controllers 1242 connect input devices, such as keyboard and mouse 1243 combinations, a camera 1244, or other USB input devices.

The following pertains to further examples.

Example 1 is an apparatus, comprising a computer readable memory; an XMSS operations logic to manage XMSS functions; a chain function controller to manage chain function algorithms; a secure hash algorithm-2 (SHA2) accelerator; a secure hash algorithm-3 (SHA3) accelerator; and a register bank shared between the SHA2 accelerator and the SHA3 accelerator.

In Example 2, the subject matter of Example 1 can optionally include logic to receive, in the computer readable memory, a set of XMSS inputs for an XMSS operation; determine a selected accelerator from at least one of the SHA2 accelerator or the SHA3 accelerator; and apply the set of inputs to the selected accelerator.

In Example 3, the subject matter of any one of Examples 1-2 can optionally include comprising logic to assert a busy signal on a communication bus; and switch to a protected mode in which external read/write operations are disregarded.

In Example 4, the subject matter of any one of Examples 1-3 can optionally include logic to determine whether the XMSS operation utilizes a one-time signature function, and in response to a determination that the XMSS operation requires a one-time signature function, to apply a one-time signature function process to the set of XMSS inputs; and invoke the chain function controller to apply a chain function to facilitate the one-time signature function.

In Example 5, the subject matter of any one of Examples 1-4 can optionally include an arrangement wherein the SHA2 accelerator comprises a 64 bit datapath that is configurable to perform a single SHA2-512 round of operations or to perform two SHA2-256 rounds of operation in parallel.

In Example 6, the subject matter of any one of Examples 1-5 can optionally include an arrangement wherein the SHA2 accelerator comprises a conditional carry propagation circuitry to selectively apply a carry operation when the SHA2 accelerator is configured to perform two SHA2-256 rounds of operation in parallel.

In Example 7, the subject matter of any one of Examples 1-6 can optionally include an arrangement wherein the SHA2 accelerator comprises a conditional carry propagation circuitry to selectively terminate a carry operation when the SHA2 accelerator is configured to a single SHA2-512 round of operation.

In Example 8, the subject matter of any one of Examples 1-7 can optionally include an arrangement wherein the SHA3 accelerator is configurable to perform a SHAKE-128 function or to perform a SHAKE-256 operation.

In Example 9, the subject matter of any one of Examples 1-8 can optionally include an arrangement wherein the SHA3 accelerator comprises a 1600 bit state register to receive a first set of inputs for each WOTS chain function, a second set of inputs for hashes involved in an L-Tree computation, and a third set of inputs for a Merkle tree root node computation; and logic to receive a 256 bit message input; perform a set of 24 SHA3 rounds; and generate a 128 bit output.

In Example 10, the subject matter of any one of Examples 1-9 can optionally include an arrangement wherein the SHA3 accelerator comprises a 1600 bit state register to receive a first set of inputs for each WOTS chain function, a second set of inputs for hashes involved in an L-Tree computation, and a third set of inputs for a Merkle tree root node computation; and logic to receive a 512 bit message input; perform two sets of 24 SHA3 rounds; and generate a 256 bit output.

Example 11 is an electronic device, comprising. a processor; and a hardware accelerator for an authentication logic, the hardware accelerator comprising a computer readable memory; an XMSS operations logic to manage XMSS functions; a chain function controller to manage chain function algorithms; a secure hash algorithm-2 (SHA2) accelerator; a secure hash algorithm-3 (SHA3) accelerator; and a register bank shared between the SHA2 accelerator and the SHA3 accelerator.

In Example 12, the subject matter of Example 11 can optionally include logic to receive, in the computer readable memory, a set of XMSS inputs for an XMSS operation; determine a selected accelerator from at least one of the SHA2 accelerator or the SHA3 accelerator; and apply the set of inputs to the selected accelerator.

In Example 13, the subject matter of any one of Examples 11-12 can optionally include comprising logic to assert a busy signal on a communication bus; and switch to a protected mode in which external read/write operations are disregarded.

In Example 14, the subject matter of any one of Examples 11-13 can optionally include logic to determine whether the XMSS operation utilizes a one-time signature function, and in response to a determination that the XMSS operation requires a one-time signature function, to apply a one-time signature function process to the set of XMSS inputs; and invoke the chain function controller to apply a chain function to facilitate the one-time signature function.

In Example 15, the subject matter of any one of Examples 11-14 can optionally include an arrangement wherein the SHA2 accelerator comprises a 64 bit datapath that is configurable to perform a single SHA2-512 round of operations or to perform two SHA2-256 rounds of operation in parallel.

In Example 16, the subject matter of any one of Examples 11-15 can optionally include an arrangement wherein the SHA2 accelerator comprises a conditional carry propagation circuitry to selectively apply a carry operation when the SHA2 accelerator is configured to perform two SHA2-256 rounds of operation in parallel.

In Example 17, the subject matter of any one of Examples 11-16 can optionally include an arrangement wherein the SHA2 accelerator comprises a conditional carry propagation circuitry to selectively terminate a carry operation when the SHA2 accelerator is configured to a single SHA2-512 round of operation.

In Example 18, the subject matter of any one of Examples 11-17 can optionally include an arrangement wherein the SHA3 accelerator is configurable to perform a SHAKE-128 function or to perform a SHAKE-256 operation.

In Example 19, the subject matter of any one of Examples 11-18 can optionally include an arrangement wherein the SHA3 accelerator comprises a 1600 bit state register to receive a first set of inputs for each WOTS chain function, a second set of inputs for hashes involved in an L-Tree computation, and a third set of inputs for a Merkle tree root node computation; and logic to receive a 256 bit message input; perform a set of 24 SHA3 rounds; and generate a 128 bit output.

In Example 20, the subject matter of any one of Examples 11-19 can optionally include an arrangement wherein the SHA3 accelerator comprises a 1600 bit state register to receive a first set of inputs for each WOTS chain function, a second set of inputs for hashes involved in an L-Tree computation, and a third set of inputs for a Merkle tree root node computation; and logic to receive a 512 bit message input; perform two sets of 24 SHA3 rounds; and generate a 256 bit output.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
   a secure hash algorithm-2 (SHA2) accelerator;
   a secure hash algorithm-3 (SHA3) accelerator configurable to perform at least one of a SHAKE-128 function or to perform a SHAKE-256 operation and comprising:
   a bit state register to receive a first set of inputs for a plurality of chain functions, a second set of inputs for hashes involved in an L-Tree computation, and a third set of inputs for a Merkle tree root node computation;
   a processor to:
      receive a 256 bit message input;
      perform a set of 24 SHA3 rounds; and
      generate a 128 bit output; and
   a register bank shared between the SHA2 accelerator and the SHA3 accelerator.

2. The apparatus of claim 1, the processor to:
   receive, in computer readable memory, a set of XMSS inputs for an XMSS operation;
   determine a selected accelerator from at least one of the SHA2 accelerator or the SHA3 accelerator; and
   apply the set of inputs to the selected accelerator.

3. The apparatus of claim 2, the processor to:
   assert a busy signal on a communication bus; and
   switch to a protected mode in which external read/write operations are disregarded.

4. The apparatus of claim 3, the processor to:
   determine whether the XMSS operation utilizes a one-time signature function, and in response to a determination that the XMSS operation requires a one-time signature function, to:
      apply a one-time signature function process to the set of XMSS inputs; and
      invoke a chain function controller to apply a chain function to facilitate the one-time signature function.

5. The apparatus of claim 1, the SHA2 accelerator comprising a 64 bit datapath that is configurable to perform a single SHA2-512 round of operations or to perform two SHA2-256 rounds of operation in parallel.

6. The apparatus of claim 5, the SHA2 accelerator comprising a conditional carry propagation circuitry to selectively apply a carry operation when the SHA2 accelerator is configured to perform the two SHA2-256 rounds of operation in parallel.

7. The apparatus of claim 5, the SHA2 accelerator comprising a conditional carry propagation circuitry to selectively terminate a carry operation when the SHA2 accelerator is configured to the single SHA2-512 round of operation.

8. The apparatus of claim 1, wherein the SHA3 accelerator is configurable to perform the SHAKE-128 function or to perform the SHAKE-256 operation.

9. The apparatus of claim 8, the SHA3 accelerator comprising:
   a computer readable memory; and
   an XMSS operations processing circuitry to manage XMSS functions.

10. The apparatus of claim 8, the SHA3 accelerator comprising:
    a chain function controller to manage chain function algorithms.

11. An electronic device, comprising:
    a computer-readable memory;
    a secure hash algorithm-2 (SHA2) accelerator;
    a secure hash algorithm-3 (SHA3) accelerator configurable to perform at least one of a SHAKE-128 function or to perform a SHAKE-256 operation and comprising:
    a bit state register to receive a first set of inputs for a plurality of chain functions, a second set of inputs for hashes involved in an L-Tree computation, and a third set of inputs for a Merkle tree root node computation;

processing circuitry to:
  receive a 256 bit message input;
  perform a set of 24 SHA3 rounds; and
  generate a 128 bit output; and
a register bank shared between the SHA2 accelerator and the SHA3 accelerator.

12. The electronic device of claim 11, the processing circuitry to:
  receive, in a computer readable memory, a set of XMSS inputs for an XMSS operation;
  determine a selected accelerator from at least one of the SHA2 accelerator or the SHA3 accelerator; and
  apply the set of inputs to the selected accelerator.

13. The electronic device of claim 12, the processing circuitry to:
  assert a busy signal on a communication bus; and
  switch to a protected mode in which external read/write operations are disregarded.

14. The electronic device of claim 13, the processing circuitry to:
  determine whether the XMSS operation utilizes a one-time signature function, and in response to a determination that the XMSS operation requires a one-time signature function, to:
    apply a one-time signature function process to the set of XMSS inputs; and
    invoke a chain function controller to apply a chain function to facilitate the one-time signature function.

15. The electronic device of claim 11, the SHA2 accelerator comprising a 64 bit datapath that is configurable to perform a single SHA2-512 round of operations or to perform two SHA2-256 rounds of operation in parallel.

16. The electronic device of claim 15, the SHA2 accelerator comprising a conditional carry propagation circuitry to selectively apply a carry operation when the SHA2 accelerator is configured to perform the two SHA2-256 rounds of operation in parallel.

17. The electronic device of claim 15, the SHA2 accelerator comprising a conditional carry propagation circuitry to selectively terminate a carry operation when the SHA2 accelerator is configured to the single SHA2-512 round of operation.

18. The electronic device of claim 11, wherein the SHA3 accelerator is configurable to perform the SHAKE-128 function or to perform the SHAKE-256 operation.

19. The electronic device of claim 18, the SHA3 accelerator comprising:
  an XMSS operations processing circuitry to manage XMSS functions.

20. The electronic device of claim 18, the SHA3 accelerator comprising:
  a 1600 bit state register to receive a first set of inputs for each WOTS chain function, a second set of inputs for hashes involved in an L-Tree computation, and a third set of inputs for a Merkle tree root node computation; and
  processing circuitry to:
    receive a 512 bit message input;
    perform two sets of 24 SHA3 rounds; and
    generate a 256 bit output.

* * * * *